United States Patent
Masoian

(10) Patent No.: US 6,269,241 B1
(45) Date of Patent: Jul. 31, 2001

(54) ULTRA-Q FILTER

(75) Inventor: Leon Masoian, Olney, MD (US)

(73) Assignee: AeroComm, Inc., Englewood Cliffs, NJ (US)

( * ) Notice: Subject to any disclaimer, the term of this patent is extended or adjusted under 35 U.S.C. 154(b) by 0 days.

(21) Appl. No.: 08/979,920

(22) Filed: Nov. 26, 1997

(51) Int. Cl.$^7$ ............... H04B 7/14; H04B 1/12
(52) U.S. Cl. ........... 455/313; 455/314; 455/316; 455/76; 331/17; 333/13
(58) Field of Search ............ 333/13, 17.3, 207, 333/166, 175, 218; 455/307, 311, 313, 314, 316, 317, 318, 339, 315, 76; 331/11, 17

(56) References Cited

U.S. PATENT DOCUMENTS

| | | | |
|---|---|---|---|
| 4,205,284 | * | 5/1980 | Bouchou et al. ............ 333/189 |
| 4,647,871 | * | 3/1987 | Turner, Jr. et al. .......... 330/298 |
| 4,783,843 | * | 11/1988 | Leff et al. ................... 455/22 |
| 4,903,297 | * | 2/1990 | Rist et al. ................... 380/7 |
| 4,941,200 | * | 7/1990 | Leslie et al. ................ 455/17 |
| 4,972,346 | * | 11/1990 | Kawano et al. ............. 455/9 |
| 5,416,422 | * | 5/1995 | Dildine ...................... 324/614 |
| 5,678,218 | * | 10/1997 | Daikoku ..................... 455/278.1 |

* cited by examiner

Primary Examiner—Daniel Hunter
Assistant Examiner—Alan T Gantt
(74) Attorney, Agent, or Firm—Quarles & Brady, LLP

(57) ABSTRACT

This invention is a modular active filter that can be inserted between the antenna and a filter of a pre-existing unit, so that it can still function normally, without noise from cellular phones. This unit is modular.

Figure 1:
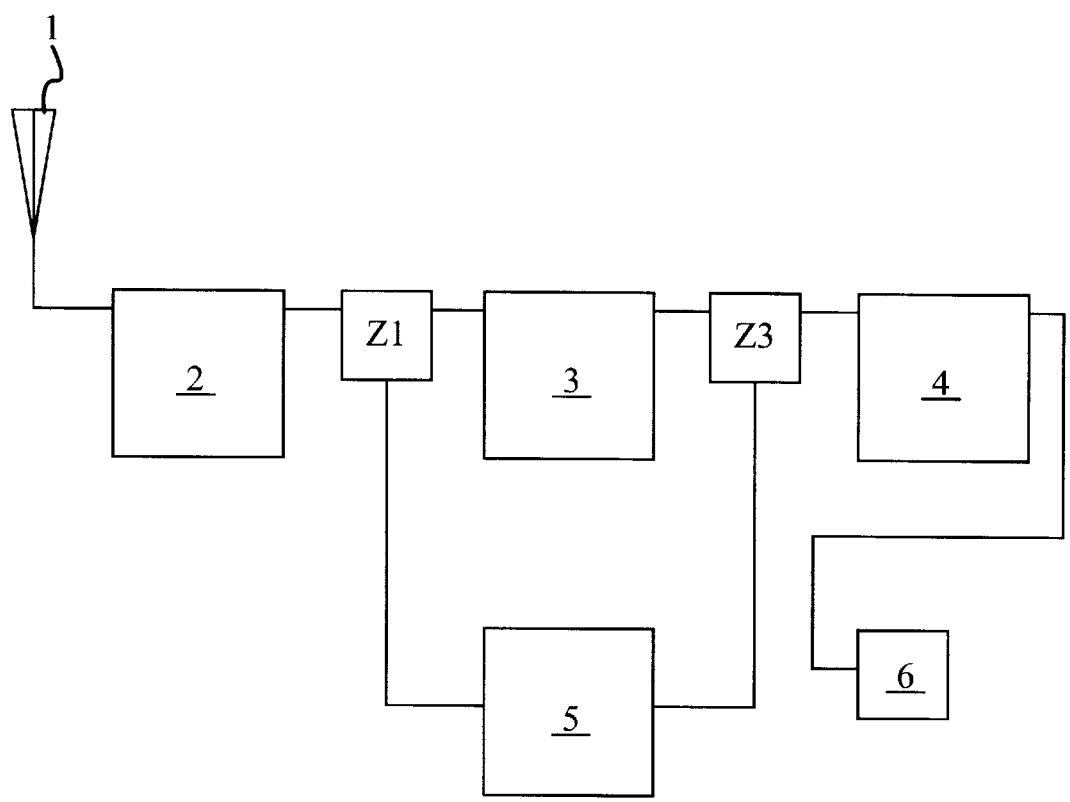

A heterodyning unit is used with a prefilter/amplifier unit and a post-filter/amplifier unit. After down converting the signal, while heterodyning, the signal is put through at least one crystal filter to filter out the noise introduced by cellular phones. To make sure that the unit works well with a wide variety of antenna-receiver pairs, the resonant frequency of the filters of the pre and post amplifier/filter units is set to the center frequency that the antenna and receiver are designed to handle. In this way, only one type of unit needs to be manufactured for each frequency band. An example of such an operating frequency might be 900 MHz.

This invention has two types of embodiments. In one type embodiment the local oscillator produces only one fixed frequency. In the second and preferred type of embodiment, the oscillator has a connector that can except input from a laptop computer, for example. A simple key pad might or any means for a user to generate a set of signals corresponding to the desired set of frequencies can also be substituted for the laptop computer. This user generated input is then used to determine the output frequency of the oscillator.

19 Claims, 8 Drawing Sheets

ULTRA-Q FILTER

BACKGROUND OF THE INVENTION

A dilemma exists in present day communications. As a result of the increased usage of cellular phones, there is a large amount of interference in bands around 900 MHz, that was not there previously. Consequently, many communications devices that used to work fine, before the advent of cellular phones are nonfunctional due to the added noise. Standard high frequency filters do not have the selectivity to filter out enough of this new noise to remedy the problem. Crystal filters have the selectivity to remedy the problem but operate at a much lower frequency.

The standard approach to filtering uses filters of the type available from TXRX, 8625 Industrial Parkway, Angola, N.Y., 14006, in their sales brochure, titled Multicouplers, Duplexers, Cavity Filters, 30 MHz to 960 MHz. Their Vari-Notch® and Series-Notch® filters are covered by U.S. Pat. Nos. 4,186,359 and 4,206,428. However, the filters of this brochure are inadequate for eliminating the noise from cellular phones. Those working in this area are baffled as to how to overcome the above mentioned dilemma.

Down converting a signal, filtering it and then up converting it and inputting it into a speaker was disclosed by U.S. Pat. No. 2,608,648. However, the input and output signal are typically different from each other in this invention.

Transponders at times have their input and output frequencies equal to one another. Heterodyning is a known technique used in some repeaters, transponders, carrier recovery systems, and phase stabilizing circuits. Some patents have issued having their input and output frequencies equal and/or that use heterodyning. The present inventor is aware of these U.S. Pat. Nos. 3,019,296, 3,946,293, 4,306,404, 4,743,843, and 4,972,346. U.S. Pat. No. 4,972,346 is of much significance to the present invention. The repeater of U.S. Pat. No. 4,783,843 is concerned with eliminating dead zones in the cellular phone bands. Thus, this repeater is set up to transpond two adjacent bands. The transponder U.S. Pat. No. 4,972,346 is concerned with eliminating the "singing" phenomenon. These problems are not the concerns of the present invention. U.S. Pat. No. 4,792,346 also as a prefilter/amplifier unit and a filter/amplifier unit after heterodyning in prior art FIG. 2, while U.S. Pat. No. 4,783,843 also has a filter before and after heterodyning. However, these patents do not discuss the purpose and the details of the filters and amplifiers before and after the heterodyning part of the circuit. These patents are for devices that are designed to connect to a known pair of antennas. The present inventor was the first to recognize the need for a device that could be inserted between a pre-existing antenna and receiver so that they can continue to operate with the additional noise from cellular phones. Furthermore, these heterodyning units all use a local oscillator of a fixed frequency, making them useful only in one frequency band.

SUMMARY OF THE INVENTION

The object of this invention is to provide a modular active filter that can be inserted between the antenna and a filter of a pre-existing unit, so that it can still function normally, without noise from cellular phones. This unit needs to be modular and needs to be able to work well with a large variety of antenna and receiver pairs, of different impedances, to be useful.

To accomplish this, a heterodyning unit is used with a prefilter/amplifier unit and a post-filter/amplifier unit. After down converting the signal, while heterodyning, the signal is put through at least one crystal filter to filter out the noise introduced by cellular phones. To make sure that the unit works well with a wide variety of antenna-receiver pairs, the resonant frequency of the filters of the pre and post amplifier/filter units is set to the center frequency that the antenna and receiver are designed to handle. In this way, only one type of unit needs to be manufactured for each frequency band. An example of such an operating frequency might be 900 MHz.

The method of using this invention involves the following steps: (1) install or adjust the resonant frequency of the filters of the pre and post amplifier/filter units to the desired frequency of operation for the antenna-receiver pair (2) disconnect the antenna from the receiver and (3) connect the antenna to the input end and the receiver to the output end of the modular active filter.

This invention has two types of embodiments. In one type embodiment the local oscillator produces only one fixed frequency. In the second and preferred type of embodiment, the oscillator has a connector that can except input from a laptop computer, for example. A simple key pad might or any means for a user to generate a set of signals corresponding to the desired set of frequencies can also be substituted for the laptop computer. This user generated input is then used to determine the output frequency of the oscillator.

BRIEF DISCUSSION DRAWINGS

FIG. 1. A block diagram of the Ultra-Q Filter.

Figure 2:
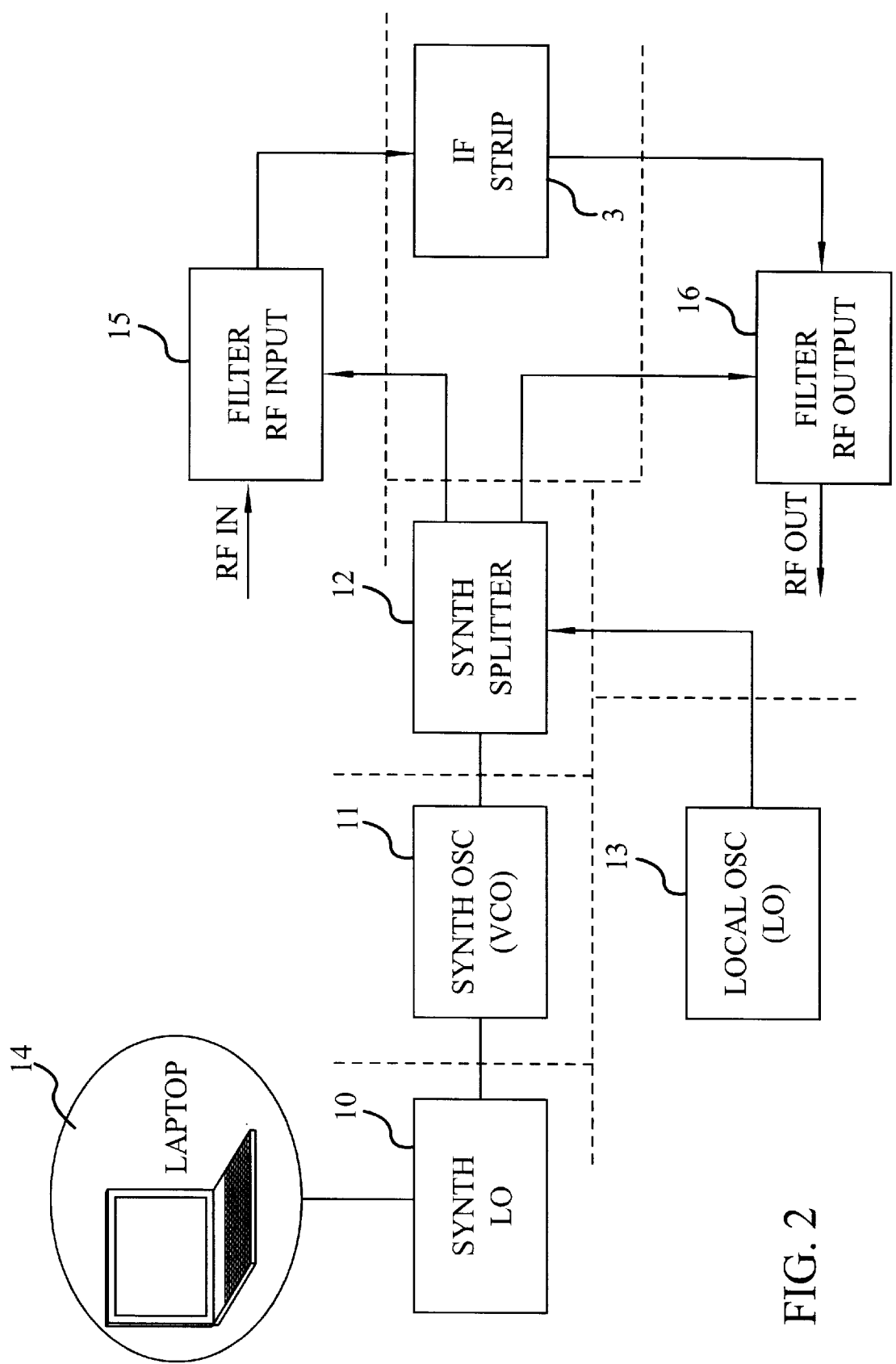

FIG. 2. A block diagram of a first embodiment of the Ultra-Q Filter, having a synthesized frequency.

Figure 3:
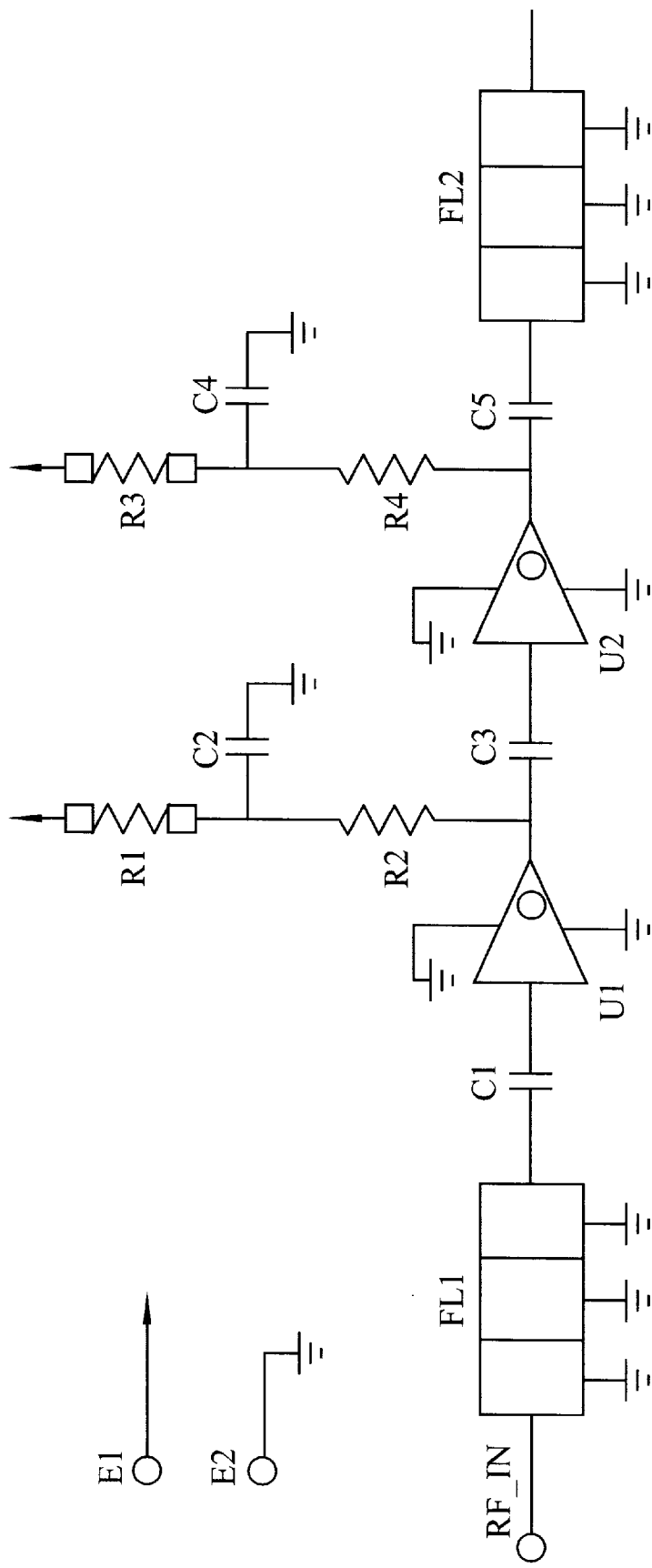

FIG. 3. A diagram of the pre and post amplifier/filter units.

Figure 4:
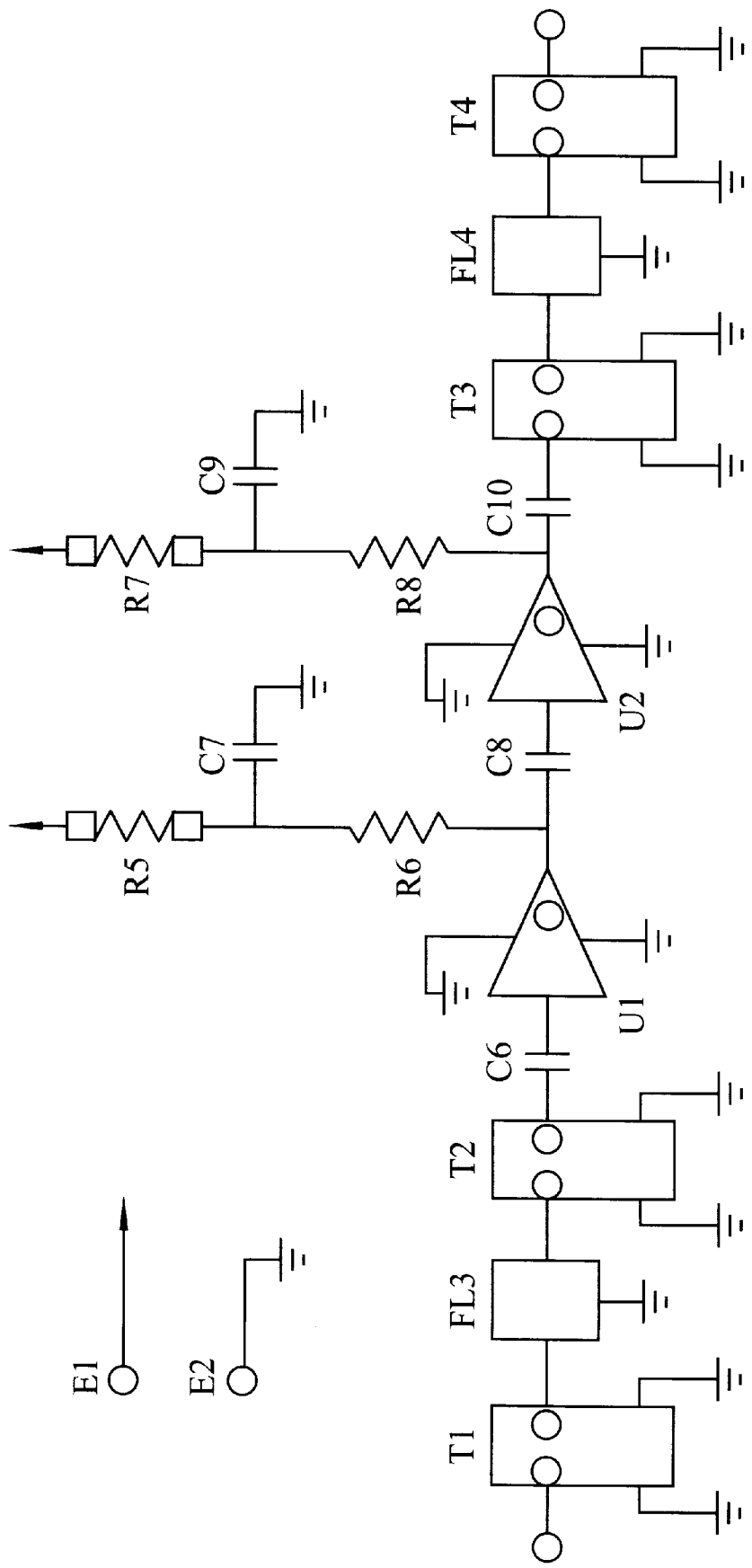

FIG. 4. A diagram of the narrow band pass filter unit.

Figure 5:
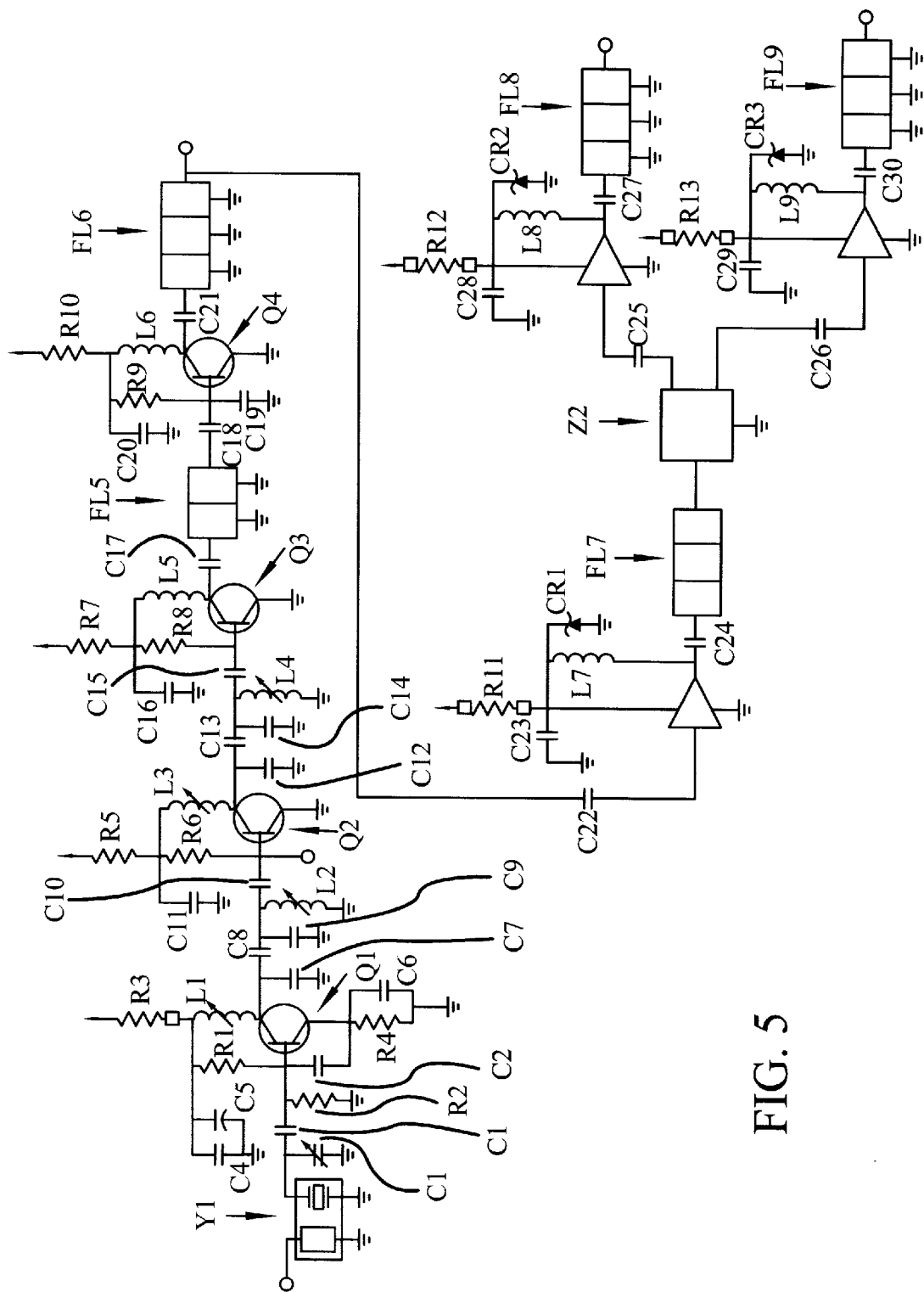

FIG. 5. A circuit diagram of the oscillator used in a embodiment, having a fixed frequency.

Figure 6:
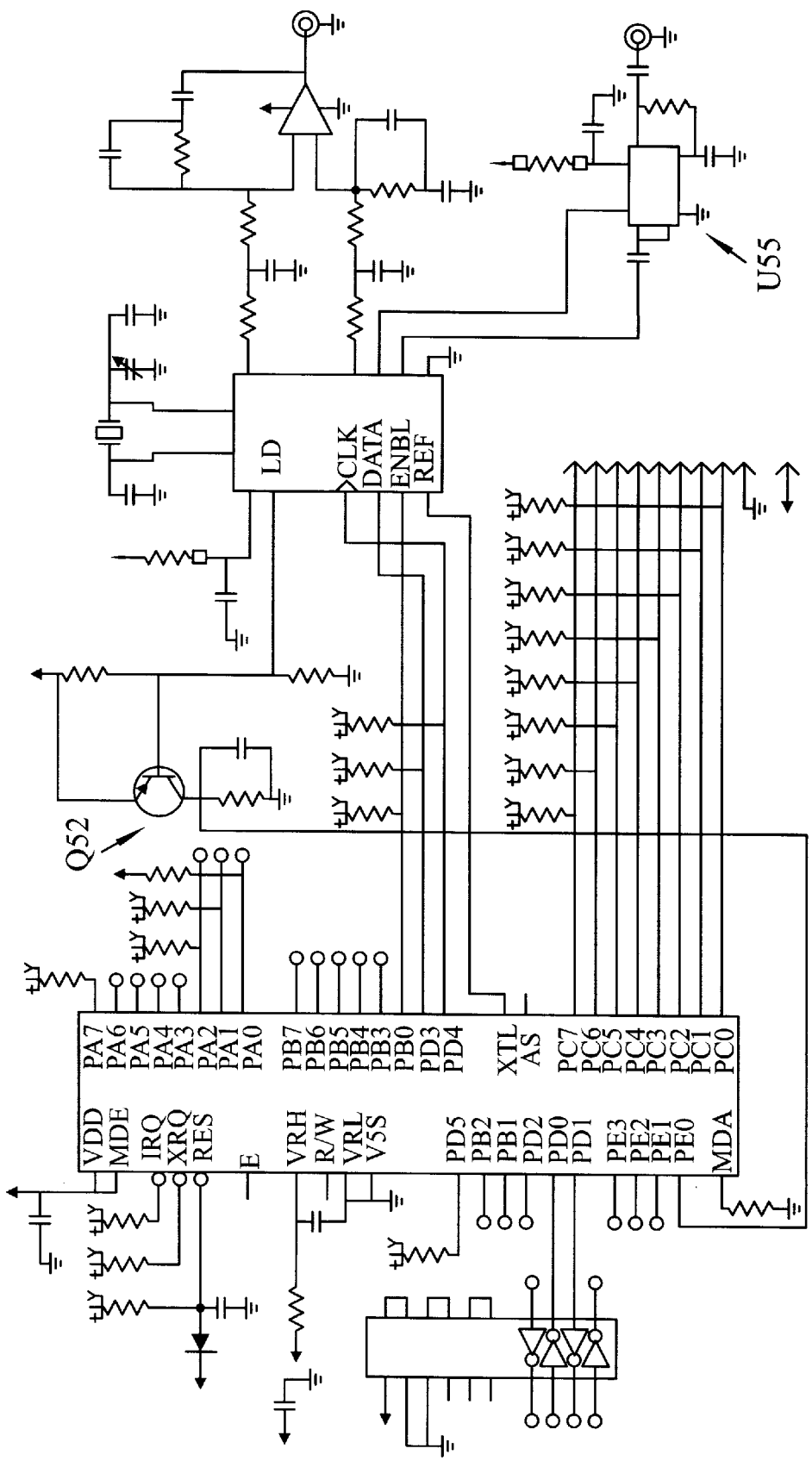

FIG. 6. A circuit diagram of the synthesized local oscillator of FIG. 2.

Figure 7:
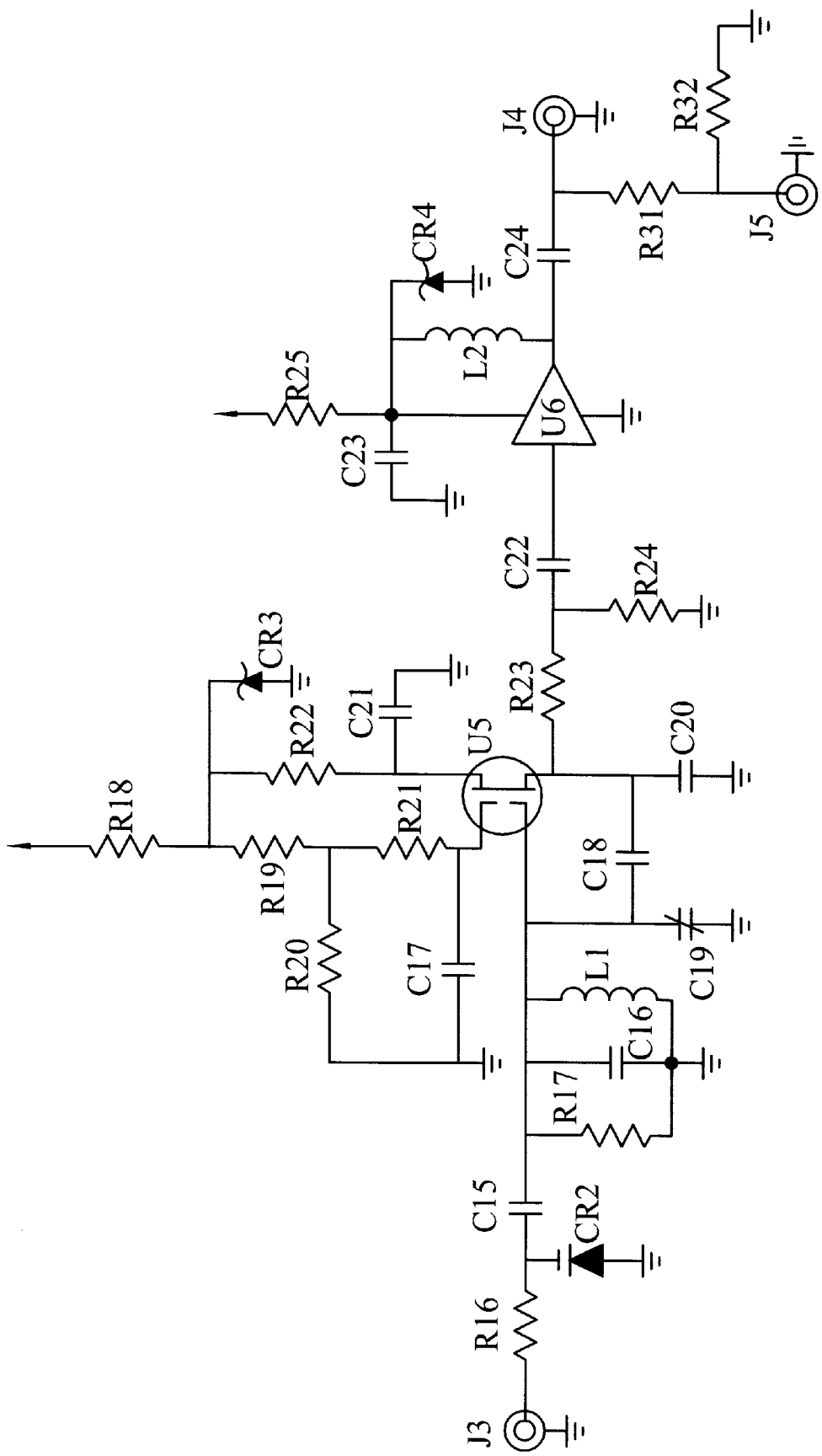

FIG. 7. A circuit diagram of the voltage controlled oscillator of FIG. 2.

Figure 8:
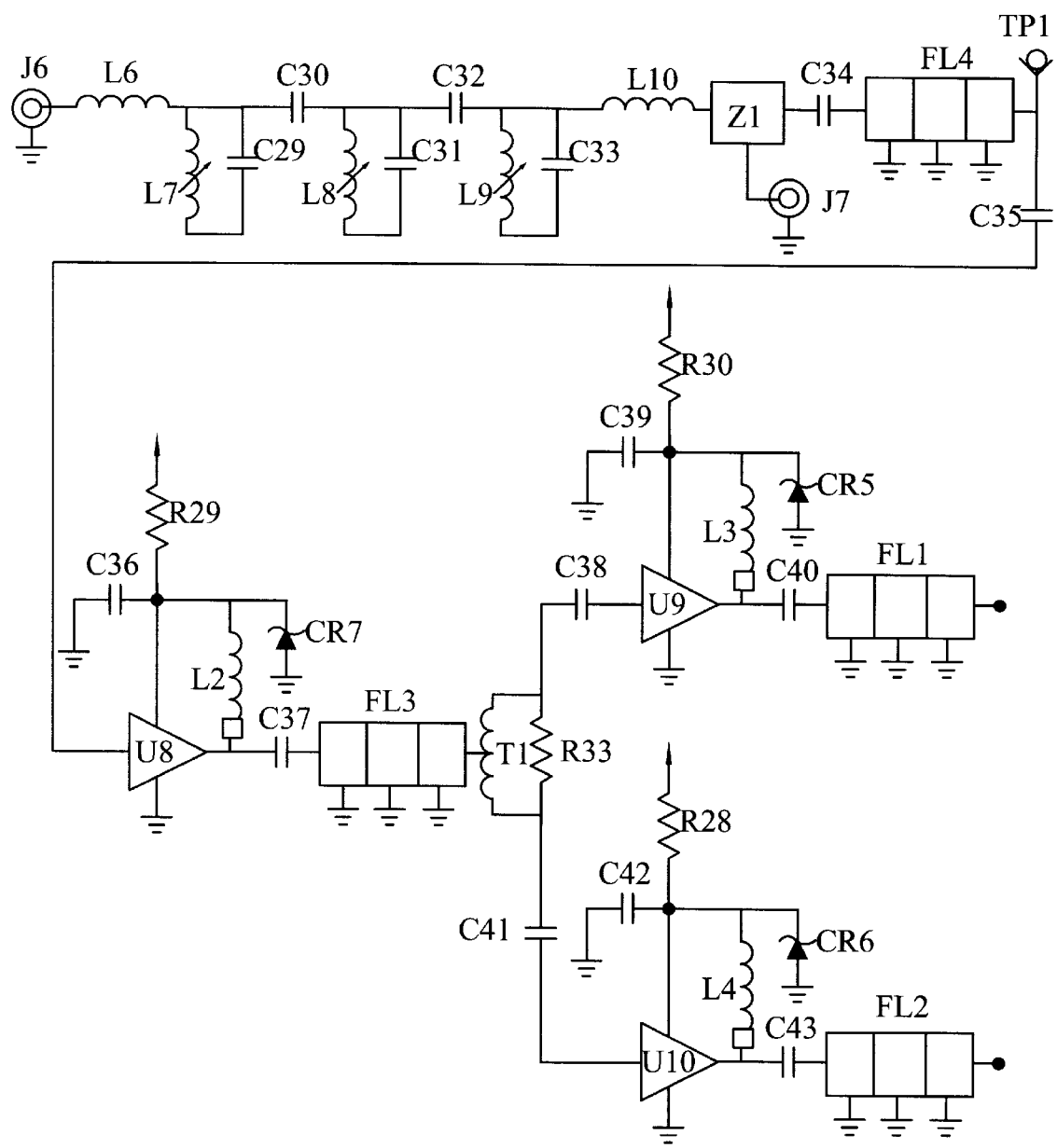

FIG. 8. A circuit diagram of the synthesized splitter of FIG. 2.

DETAILED DESCRIPTION OF THE DRAWINGS

FIG. 1 shows a block diagram of the modular active filter of this invention. It has an input which comes from a connector that is to be connected to an antenna 1. The signal goes to a pre-amplifier/filter 2 and then to a mixer Z1. At the mixer Z1, the signal is combined with a signal from an oscillator unit 5. The combined signal is now a superposition of two components. One component has a frequency that is the sum of the input frequency and the oscillator frequency. The second component has a frequency equal to the difference between the input and oscillator frequencies. This combined frequency enters a low frequency, narrow band pass filter or IF strip 3. This filter 3 rejects the first component because it is a high frequency. Also, filter 3 removes the noise introduced by the cellular phones of nearby frequencies. The signal then goes from the filter 3 to the second mixer Z3. The signal from the filter 3 is combined with a signal from the oscillator unit 5. The signal leaving the mixer 6 is a superposition of the sum and difference of the oscillator signal and the signal from filter 3. The sum part of the signal is the same frequency as the signal input from the antenna 1. The difference signal is of a lower frequency. It is rejected by the post amplifier/filter 4, which has a high frequency band pass filter within. The filtered signal is then sent to the receiver 6.

FIG. 2 shows the synthesized frequency embodiment of the Ultra-Q filter. In this preferred embodiment, the oscillator unit 5 of FIG. 1 is made up of synthesized local oscillator 10, a voltage controlled oscillator 11, a synthesized splitter 12 and a local oscillator 13. The oscillator unit 5 could be replaced by any means of generating an oscillating signal dependent on the input of a user. A laptop computer 14 is used to generate a code corresponding to the desired frequency. This code controls the voltage level of the synthesized local oscillator 10 and could be any means of producing a fixed frequency output with an output voltage dependent on the users input. In the preferred embodiment, the frequency of the synthesized local oscillator 10 uses a crystal oscillator of about 82.5 MHz. Depending on the voltage level of the output of the synthesized local oscillator 10, the voltage controlled oscillator 11 produces an oscillatory signal in a range of frequencies between a predetermined high frequency and low frequency, $f_{min}$ and $f_{max}$, which in the preferred embodiment are 84 and 85 MHz. The synthesized local oscillator 10 produces a voltage within a range of voltages between a predetermined high voltage and a predetermined low frequency $V_{min}$ and $V_{max}$. In the preferred embodiment these voltages are 1 Volt and 8 Volts. In the preferred embodiment, the higher the output voltage of the synthesized local oscillator 10, the higher the frequency of output of the voltage controlled oscillator 11. However, the circuitry of the voltage controlled oscillator 11 could easily be modified so that the lower the voltage input, the higher the frequency of output of the voltage controlled oscillator 11. The voltage controlled oscillator 11 could be replaced with any means having a one-to-one correspondence between the input voltage and the output frequency. However, the disclosed voltage controlled oscillator 11 is preferred. The output of the voltage controlled oscillator 11 is mixed with the output of a local oscillator 13, within the synthesized splitter 12. In the preferred embodiment this local oscillator 13 has an output frequency of 934 MHz. The exact value of this local oscillator 13 and of $f_{min}$ and $f_{max}$ are not critical. The important thing is that the sum of the two frequencies is the selected frequency, fc, plus and $f_{delta}$ of 90 MHz. The value of 90 MHz for $f_{delta}$ is preferred but not critical. The important thing in determining $f_{delta}$ is that it is near enough to the center of the frequency band of the narrow band pass filter (e.g. the crystal filter) so that it filters the signal well. Preferably, $f_{delta}$ should be the center of the frequency band that the narrow band pass filter (e.g. the crystal filter) filters best. The mixed signal is split into two identical signals. One of the signals is fed into the mixer Z1 following the pre-filter. The mixers Z1, Z3 and Z4 could be any means of combining two signals to form a signal that has one component that is the sum of the two input signals and one that is the difference of the two input signals. Mixer Z1 only needs to produce a signal that is the difference of the two signals, while mixer Z3 and Z4 only need to produce the sum of the two input signals. The other of the signals is fed into the mixer Z3 of the post filter. The local oscillator of this embodiment could be the same as the oscillator of the fixed frequency embodiment, except without the splitter. In FIG. 2 filter 15 includes mixer Z1 and the pre-filter/amplifier 2. Similarly, filter 16 includes mixer Z3 and the post-filter/amplifier 4.

FIG. 3 shows the circuit used for the pre and post amplifier/filters 2 and 4. This has two high frequency, passive band pass filters FL1 and FL2. As the pre amplifier/filter, they filter out the noise introduced by any impedance mismatch. The loss of amplitude due to impedance mismatch with the antenna is compensated for by the amplifiers U1 and U2. Filter FL1 could be adequate, by itself, but two filters are used to improve the degree of filtering of this unit provides. Capacitors C1, C3 and C5, remove any DC component in the signal.

Resistors R1 and R2 and capacitor C2 provide decoupling to avoid ground loops. Likewise, Resistors R3 and R4 and capacitor C4 provide decoupling to avoid ground loops. Although this method of decoupling is the preferred method used through out this device, any other means of decoupling to avoid ground loops could be used, through out the device. Alternatively, other means of avoiding ground loops could be used, such as grounding everything to a ground plane.

The preferred embodiment does not have amplifier U2, resistors R3 and R4, and capacitors C4 and C5. As the post amplifier/filter, filters FL1 and FL2 reject the image signal, while the amplifier U1 compensates for the resulting loss in signal. The resonant frequency of the passive filters FL1 and FL2 is set to the center of the band which the antenna and receiver were designed to accept. Any other means of amplifying or filtering could be used as long as the signal is amplified enough so that output of the Ultra-Q is still within the acceptance range of the receiver and the impedance mismatch is compensated for.

FIG. 4 shows the a narrow band pass filter unit 3. The crystal filters FL3 and FL4 provide highly selective narrow band pass filters. Crystal filters FL3 and FL4 are sandwiched between transformers T1 and T2 and between T3 and T4, respectively. Amplifiers U3 and U4 compensate for the power loss associated with the rejected image. Capacitors C6, C8, and C10, eliminate any DC component. Resistors R5, R6, R7 and R8 and capacitors C7 and C9 provide decoupling, to avoid, grounding problems. This way the wires do not have to be grounded to the same point. The preferred embodiment does not have resistors R7 and R8, capacitors C9 and C10, and amplifier U4. Note that in the preferred embodiment, the band pass filter unit does not have any other band pass filter units connected in parallel with it. Also, in the preferred embodiment, the band pass filters, e.g. the crystal filters, of the band pass filter unit are also in series and not in parallel.

FIG. 5 shows the oscillator unit 5 of FIG. 1 for the fixed frequency embodiment. Although the circuit disclosed for this oscillator is preferred any oscillator that produces a fixed frequency in the desired range for the particular application, could be used, e.g. about 900 MHz. The oscillator unit 5 is made up of a local oscillator and a splitter. The local oscillator has four stages. The first two stages perform a 3× multiplication of the frequency. The second two stages create a 2× multiplication of the frequency. Any means of multiplying the initial frequency of the oscillator to get the selected frequency fc plus $f_{delta}$ could be used to replace the 2× and 3× multiplication stages. The principle under which each stage operates is the transistor Q1, Q2, Q3, and Q4 are each over-driven, effectively decomposing the input signal into higher frequency harmonics. Each stage is essentially an amplifier set to the desired harmonic. Crystal oscillator Y1, includes an oven to keep the temperature of the crystal constant. Thereby, the frequency generated by the crystal oscillator Y1 is also kept constant. Additional filtering is provided by filters FL5, FL6, FL7, and FL8. Mixer Z2 is used to split the signal into two signals of the same frequency. The mixer Z2 could be replaced with any means of splitting the signal into two identical signals. The variable capacitor is used to fine tune the frequency put out by the crystal oscillator. The variable inductors are adjusted to maximize the power output.

FIG. 6 shows the synthesized local oscillator of FIG. 2. It has an RS-232 level shifter, that converts the signal of an laptop computer, for example, to a signal intelligible by the single chip micro-computer. The microm-computer used here is MC68HC811E2P Microcontroller of Motorola HC11M68HC11 E Series, Revision 1, 1995. The RS-232 level shifter used here is MAX233EPE, Multichannel RS-232 Driver/Reciever of Maxim 1993 New Data Releases Data Book, Volume II. Of course any serial port level shifter could be used. Also GPIB or other parallel port inputs could be used and the RS232 level shifter would be replaced with the appropriate circuitry for converting the parallel input signals into the type of input acceptable or intelligible to the micro-computer chip. The signal from the micro-computer chip feeds into the phase lock loop chip. The signal from the phase lock loop chip is fed into amplifier U54, to determine the voltage of this amplifiers output. The phase lock loop chip used here is the MC145158 Serial Input Frequency Synthesizer of Motorola, CMOS Application Specific, Revision 1, 1991. Chip U55 is a prescale and performs a divide by 64 on a feed back signal. This chip is the MC12025 500 MHz Dual Modulus Prescaler of Motorola 1993, MECL Data Revision 5. This feed back signal is fed back thru the phase lock loop chip and transistor Q52, to determine if the output of amplifier U54 is correct. This is MC33171D Operational Amplifier of Motorola Linear/Interface Ics, Volume I, Revision 4, 1993. If the output of the amplifier U54 is incorrect, the signal returning from the transistor Q52 causes the micro-computer chip to adjust its output.

In the voltage controlled oscillator of FIG. 7, CR2 is a varactor and U5 is a dual gate FET. The dual gate FET U5 is used to create an oscillator. The varactor CR2 is used to set the frequency of this oscillator. The Zener diode keeps the root mean square voltage of this oscillator constant. Junction J5 provides the feed back signal to the synthesized oscillator. The varactor is used to change the frequency of the signal.

In FIG. 8, the signal first goes through a band pass filter, formed by the variable inductors and resistors. The variable inductors are tuned to maximize the power output. The filter after the mixer Z4 is used to reject the signal that is the difference of the two signals input into the mixer. Then the signal goes through the splitter to spilt the signal in two. After splitting, the signal has roughly half the current as before splitting. Therefore, each of the two signals are sent through an additional amplifier. The Zener diodes are used to fix the voltage levels.

Those people interested in buying the filter of the present invention are unable to figure out how to make a filter that has the same Q at the frequencies at which the present filter operates.

I claim:

1. An active filter comprising:
   a circuit that corrects for impedance mismatch of an input signal, without matching its impedance;
   a heterodyning unit having an input signal frequency and an output signal frequency that are equal; the heterodyning unit comprising:
      a first mixer operable to downconvert the input signal
      a second mixer operable to upconvert to the output signal
      a local oscillator for outputting a first frequency signal, the first frequency signal being fixed;
      a voltage controlled oscillator for outputting a second frequency signal, the second frequency signal selected from a range of frequency signals;
      a synthesized splitter operable to receive the first frequency signal and the second frequency signal and to combine the first frequency and the second frequency to form a combined frequency and supply the same combined frequency to the first mixer and the second mixer; and
   a circuit that corrects for impedance mismatch of the output signal, without matching its impedance.

2. An active filter as in claim 1, further comprising a connector wherein an antenna can be connected to the input of said circuit that corrects for impedance mismatch of an input signal, and a connector wherein a receiver can be connected to said circuit that corrects for impedance mismatch of the output signal;
   wherein said circuit that corrects for impedance mismatch of an input signal is a first filter that filters a first signal of a first frequency;
   wherein said heterodyning unit has
      a band pass filter unit having at least one crystal filter centered at said low frequency, and
   wherein said circuit that corrects for impedance mismatch of an output signal is a second filter that filters said second combined signal, rejecting said signal of another frequency.

3. A method of filtering a signal comprising:
   the step of connecting said active filter of claim 1 to an input of a receiver.

4. An active filter of claim 2, wherein said band pass filter unit is connected in series and any band pass filters of said band pass filter unit are connected in series.

5. An active filter of claim 4, further comprising:
   a first transformer immediately upstream to said at least one crystal filter; and
   a second transformer immediately down stream to said at least one crystal filter.

6. An active filter of claim 5, wherein said at least one crystal filter is two crystal filters,
   a first transformer immediately upstream to said a first crystal filter;
   a second transformer immediately down stream to said first crystal filter;
   a third transformer immediately upstream to a second crystal filter; and
   a fourth transformer immediately down stream to said second crystal filter.

7. An active filter as in claim 6, further comprising:
   an amplifier between and in series with said second and third transformer.

8. An active filter as in claim 7, further comprising:
   two capacitors, one capacitor capacitively coupling said amplifier to said second transformer and a second capacitor capacitively coupling said amplifier to said third transformer.

9. An active filter as in claim 8, further comprising:
   two resistors connected to each other at only one junction;
   a capacitor connected at one end to said junction and at an other end to ground;
   one of said two resistors connected to a junction between said amplifier and said capacitor capacitively coupling said amplifier to said third transformer.

10. An active filter as in claim 2, wherein said first filter and said second filter have identical components.

11. An active filter as in claim 10, further comprising:
    an amplifier between and in series with said second said two identical filters.

12. An active filter as in claim 11, further comprising:

two resistors connected to each other at only one junction;

a capacitor connected at one end to said junction and at an other end to ground;

one of said two resistors connected to a junction between said capacitor capacitively coupling said amplifier to said second transformer and said capacitor capacitively coupling said amplifier to said third transformer.

13. An active filter of claim 12, wherein all filters of said band pass filter are connected in series;

also, wherein said at least one crystal filter is two crystal filters, a first transformer immediately upstream to said a first crystal filter;

a second transformer immediately down stream to said first crystal filter;

a third transformer immediately upstream to a second crystal filter;

a fourth transformer immediately down stream to said second crystal filter;

a noncrystal filter between said second and third transformer; said filter having two resistors connected to each other at only one junction, a capacitor connected at one end to said junction and at an other end to ground, one of said two resistors connected to a junction between said capacitor immediately upstream and said capacitor immediately down stream, and an operational amplifier immediately before said junction between said capacitor immediately upstream and said capacitor immediately downstream;

two capacitors, one capacitor immediately upstream to said filter and one capacitor immediately downstream to said noncrystal filter.

14. An active filter of claim 2, wherein said oscillator further comprises:

a crystal oscillator for producing an initial oscillatory signal;

a series of frequency multipliers for multiplying the frequency of said initial oscillatory signal; and a band pass filter for filtering the output of said series of frequency multipliers to provide a spurious free oscillatory signal.

15. An active filter of claim 2, wherein said oscillator further comprises:

a connector that receives an input signal; and a synthesized oscillator circuit that produces said signal of a second frequency;

wherein said second frequency is determined by said input signal received at said connector.

16. An active filter of claim 2, wherein said synthesized oscillator circuit further comprises:

a first local oscillator that produces a fixed frequency output that has a voltage that is determined by said input signal received by said connector;

a voltage controlled oscillator circuit that uses the output of said local oscillator as its input, and has as its output a signal of a frequency that is determined by the voltage of its input;

a second local oscillator having a fixed frequency output; and a splitter circuit that has a mixing unit and a splitting unit; said mixing unit mixes said output of said second local oscillator and said output of said voltage controlled oscillator to form a signal, said splitter unit then splits said signal into two identical output signals, said two output signals are said signal of a second frequency of said oscillator.

17. An active filter of claim 14, wherein said means for producing an oscillatory further comprising:

a crystal oscillator having a crystal heated by an oven, producing a crystal oscillator frequency;

a first stage that triples said crystal oscillator frequency;

a second stage that triples any output of said first stage;

a third stage that triples any output of said second stage;

a fourth stage that doubles any output of said third stage;

a fifth stage that doubles the output of said fourth stage;

a first filter capacitively coupled to said fifth stage is immediately upstream to said fifth stage;

a second filter capacitively coupled to said fifth stage is immediately downstream to said fifth filter;

capacitive coupling is used to connect each stage.

18. An active filter comprising:

a means for correcting for impedance mismatch of an input signal, without matching its impedance;

a means for heterodyning, said means for heterodyning having an input signal frequency and as output signal frequency that are equal the means for heterodyning including:

a first mixer operable to downconvert the input signal a second mixer operable to upconvert to the output signal a means for outputting a first frequency signal, the first frequency signal being fixed;

a means for outputting a second frequency signal, the second frequency signal selected from a range of frequency signals;

a combining means coupled to the means for outputting a first frequency signal and the means for outputting a second frequency signal for receiving the first frequency signal and the second frequency signal and for combining the first frequency signal and the second frequency signal to form a combined frequency signal and for supplying the same combined frequency to the first mixer and the second mixer; and a means for correcting for impedance mismatch of the output signal, without matching its impedance.

19. An active filter as in claim 18 further comprising:

a means of inputting a signal front an antenna to said means for correcting for impedance mismatch of an input signal, and a means of modularly connecting said means for correcting for impedance mismatch of the output signal to a receiver;

wherein said means for correcting for impedance mismatch of an input signal is a first means of filtering a first signal of a first frequency;

wherein said means for correcting for impedance mismatch of an output signal is a first means of filtering said second combined signal, rejecting said signal of another frequency; and wherein said means for heterodyning has a band pass filter having at least one crystal filter centered at said low frequency.

* * * * *